(12) United States Patent
Caveney et al.

(10) Patent No.: US 8,474,765 B2
(45) Date of Patent: *Jul. 2, 2013

(54) RELEASABLE BARB ASSEMBLY

(75) Inventors: Jack E. Caveney, North Palm Beach, FL (US); Steven M. Forster, Aurora, IL (US)

(73) Assignee: Panduit Corp., Tinley Park, IL (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/180,631

(22) Filed: Jul. 12, 2011

(65) Prior Publication Data

US 2011/0268496 A1    Nov. 3, 2011

Related U.S. Application Data

(60) Continuation of application No. 12/788,686, filed on May 27, 2010, now Pat. No. 7,992,279, which is a continuation of application No. 11/764,892, filed on Jun. 19, 2007, now Pat. No. 7,752,730, which is a division of application No. 10/808,974, filed on Mar. 25, 2004, now Pat. No. 7,246,778.

(60) Provisional application No. 60/458,139, filed on Mar. 27, 2003, provisional application No. 60/484,405, filed on Jul. 2, 2003, provisional application No. 60/484,429, filed on Jul. 2, 2003, provisional application No. 60/493,656, filed on Aug. 8, 2003.

(51) Int. Cl.
*F16L 3/22* (2006.01)
*F16B 1/04* (2006.01)

(52) U.S. Cl.
USPC ..................................... 248/68.1; 403/322.4

(58) Field of Classification Search
USPC ................... 29/450, 890.036, 418, 446, 449, 29/488; 403/322.4, 322.1, 387, 302, 309, 403/341, 402, 122; 248/68.1; 439/864, 439, 439/441; 52/11, 220.5
See application file for complete search history.

(56) References Cited

U.S. PATENT DOCUMENTS 834,828 A    10/1906  Lutz
917,328 A     4/1909  Lutz
(Continued)

FOREIGN PATENT DOCUMENTS

DE    526367        6/1931
DE    2706191 A     8/1978
(Continued)

OTHER PUBLICATIONS

Standard Search Report from European Patent Office, File No. RS 107377 US, Completed Sep. 14, 2001, 4 pages.

(Continued)

*Primary Examiner* — John C Hong
(74) *Attorney, Agent, or Firm* — Robert A. McCann; Christopher S. Clancy; Aimee E. McVady

(57) ABSTRACT

The embodiments provide a barb assembly for use with a cable duct component to oppose removal of a cable duct section from the cable duct component. The barb assembly can comprise a releasable assembly for applying a force to a barb and, responsive to the application of the force, for moving the barb and one or more barb arms from an unengaged position to an engaged position without the use of tools. The barb assembly and/or cable duct component can also comprise a spring bias, which can bias the releasable assembly to the unengaged position upon actuating the releasable assembly to the unengaged position. The embodiments also provide methods of installing cable duct components and systems with the above-described features.

19 Claims, 16 Drawing Sheets

U.S. PATENT DOCUMENTS

| | | | |
|---|---|---|---|
| 1,087,791 | A | 2/1914 | Leavitt |
| D49,688 | S | 9/1916 | Abbott |
| D49,694 | S | 9/1916 | Abbott |
| D52,954 | S | 2/1919 | Hubbard et al. |
| 1,590,569 | A | 6/1926 | Fisk |
| 1,682,840 | A | 9/1928 | Foerch, Jr. |
| 1,862,433 | A | 6/1932 | Ross |
| 2,316,166 | A | 4/1943 | Huguelet |
| 2,682,321 | A | 6/1954 | Le Brock |
| 2,821,154 | A | 1/1958 | Tennison, Jr. |
| 2,823,056 | A | 2/1958 | Di Meo et al. |
| 2,829,190 | A | 4/1958 | Comlossy, Jr. |
| 2,834,622 | A | 5/1958 | Reeves |
| D184,913 | S | 4/1959 | Cataldo |
| 3,023,032 | A | 2/1962 | Johnston et al. |
| 3,042,351 | A | 7/1962 | Du Bois |
| 3,272,537 | A | 9/1966 | Stone et al. |
| 3,275,355 | A | 9/1966 | Endler et al. |
| 3,351,699 | A | 11/1967 | Merckle |
| 3,370,121 | A | 2/1968 | Merckle |
| 3,401,721 | A | 9/1968 | George |
| 3,425,456 | A | 2/1969 | Schibig |
| 3,451,033 | A | 6/1969 | Flachbarth |
| 3,457,598 | A | 7/1969 | Mariani |
| 3,471,629 | A | 10/1969 | O'Leary |
| 3,570,546 | A | 3/1971 | Jackson |
| 3,600,010 | A | 8/1971 | Downs, III et al. |
| 3,633,628 | A | 1/1972 | Duquette et al. |
| 3,841,101 | A | 10/1974 | Henfrey |
| 3,875,618 | A | 4/1975 | Schuplin |
| 3,906,146 | A | 9/1975 | Taylor |
| 3,931,946 | A | 1/1976 | Soltysik |
| 3,938,767 | A | 2/1976 | Norris |
| 4,099,749 | A | 7/1978 | Van Vliet |
| 4,105,051 | A | 8/1978 | Visentin |
| 4,163,572 | A | 8/1979 | Benscoter |
| 4,202,090 | A | 5/1980 | Cook |
| 4,270,020 | A | 5/1981 | Kenworthy et al. |
| 4,305,236 | A | 12/1981 | Williams |
| 4,306,109 | A | 12/1981 | Nattel |
| 4,398,564 | A | 8/1983 | Young et al. |
| 4,602,124 | A | 7/1986 | Santucci |
| 4,627,469 | A | 12/1986 | Buard |
| 4,931,597 | A | 6/1990 | Kimbrough et al. |
| 4,954,015 | A | 9/1990 | McGowan |
| 5,035,092 | A | 7/1991 | Brant |
| 5,038,528 | A | 8/1991 | Brant |
| D320,782 | S | 10/1991 | Henneberger |
| D321,682 | S | 11/1991 | Henneberger |
| 5,067,678 | A | 11/1991 | Henneberger et al. |
| 5,100,221 | A | 3/1992 | Carney et al. |
| D327,874 | S | 7/1992 | Henneberger |
| 5,161,580 | A | 11/1992 | Klug |
| D334,380 | S | 3/1993 | Henneberger |
| 5,271,585 | A | 12/1993 | Zetena, Jr. |
| 5,271,586 | A | 12/1993 | Schmidt |
| D347,209 | S | 5/1994 | Henneberger |
| 5,316,243 | A | 5/1994 | Henneberger |
| 5,316,244 | A | 5/1994 | Zetena, Jr. |
| 5,391,840 | A | 2/1995 | Hughes et al. |
| 5,522,675 | A | 6/1996 | Gunter |
| 5,735,637 | A | 4/1998 | Gunter |
| 5,752,781 | A | 5/1998 | Haataja et al. |
| 5,872,336 | A | 2/1999 | Long |
| 6,192,181 | B1 | 2/2001 | Haataja et al. |
| 6,450,458 | B1 | 9/2002 | Bernard |
| 6,523,791 | B2 | 2/2003 | Bernard et al. |
| 6,559,378 | B1 | 5/2003 | Bernard |
| 6,612,255 | B1 | 9/2003 | Wragg |
| 6,634,605 | B2 | 10/2003 | Bernard et al. |
| 6,709,186 | B2 | 3/2004 | Ferris et al. |
| 6,712,649 | B2 | 3/2004 | Matsuda et al. |
| 7,246,778 | B2 | 7/2007 | Caveney et al. |
| 2003/0085327 | A1 | 5/2003 | Bernard et al. |
| 2007/0274773 | A1 | 11/2007 | Caveney et al. |

FOREIGN PATENT DOCUMENTS

| | | | |
|---|---|---|---|
| DE | 3114225 | A1 | 11/1982 |
| DE | 3346211 | A1 | 6/1985 |
| DE | 3636412 | A1 | 4/1988 |
| DE | 3804542 | A1 | 9/1989 |
| DE | 4120937 | A1 | 3/1992 |
| DE | 3879353 | | 4/1993 |
| DE | 20022356 | U1 | 12/2001 |
| EP | 0315023 | A2 | 5/1989 |
| EP | 0348285 | A1 | 12/1989 |
| EP | 0798581 | A1 | 1/1997 |
| EP | 1049226 | A2 | 11/2000 |
| FR | 1100982 | | 9/1955 |
| FR | 1138599 | | 6/1957 |
| FR | 1207610 | | 6/1958 |
| FR | 2343393 | | 9/1977 |
| FR | 2365902 | | 4/1978 |
| FR | 2488064 | | 2/1982 |
| FR | 2488742 | | 2/1982 |
| FR | 2680206 | A1 | 2/1993 |
| FR | 2686141 | A1 | 7/1993 |
| GB | 518208 | | 2/1940 |
| GB | 549840 | | 12/1942 |
| GB | 612162 | | 11/1948 |
| GB | 956898 | | 4/1964 |
| GB | 1124370 | | 8/1968 |
| GB | 1342085 | | 12/1973 |
| JP | 5130726 | | 5/1993 |
| NL | 288545 | | 3/1964 |
| SU | 920930 | | 4/1982 |
| WO | 0075550 | A1 | 12/2000 |

OTHER PUBLICATIONS

Standard Search Report from European Patent Office, File No. RS 107376 US, Completed Sep. 14, 2001, 4 pages.

Wiremold® Walker® Infloor Systems, Flushduct® and Components, Flushduct Raceway, Fittings and Activations, ED763R1, updated Dec. 2000, www.wiremold.com, 6 pages.

Wiremold® Walker® Infloor Systems, Steel Wallduct, Vertical and Horizontal Wiring Feed Solutions, ED737R1, updated Jan. 2001, www.wiremold.com, 8 pages.

Wiremold® Wire Management Systems, CNX Profile™ Series Raceway, Highly Aesthetic Surface Nonmetallic Raceway System, ED940R2, updated Jan. 2001, www.wiremold.com, 6 pages.

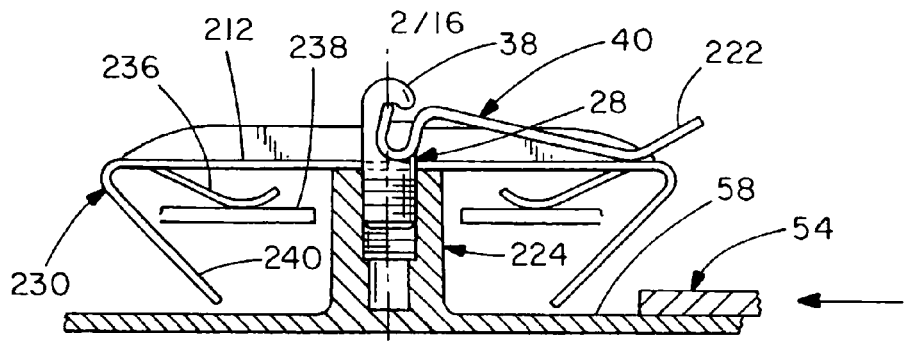
FIG. 2A
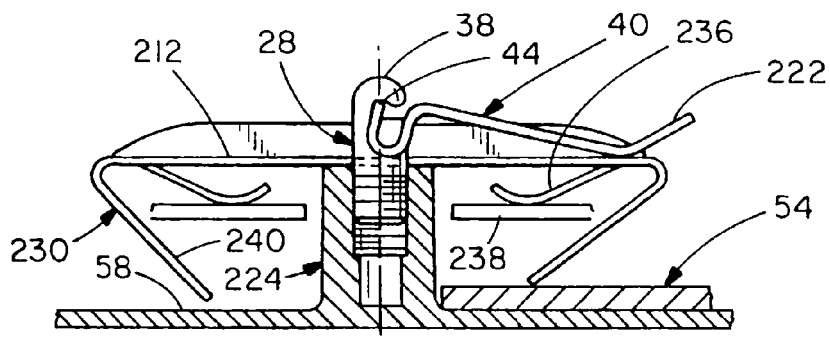
FIG. 2B
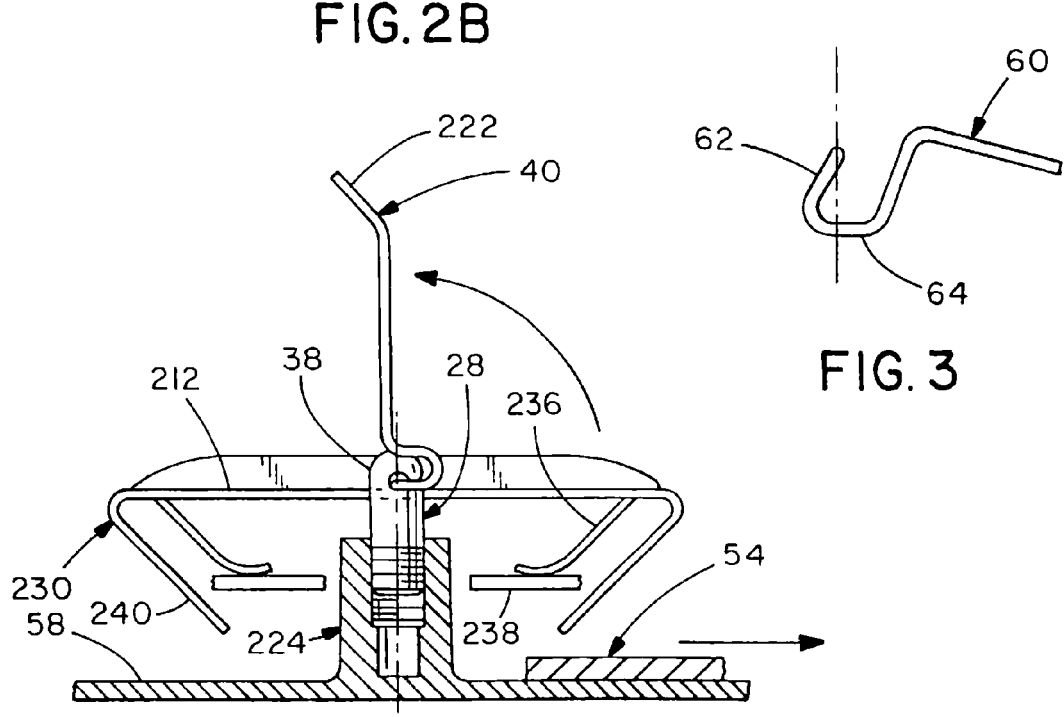
FIG. 2C
FIG. 3

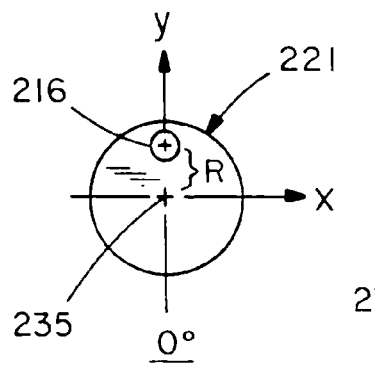
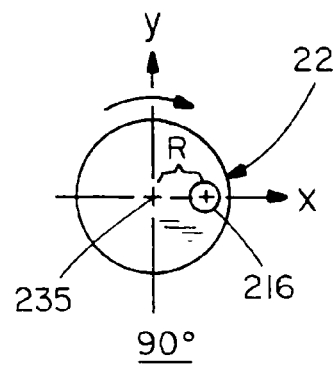
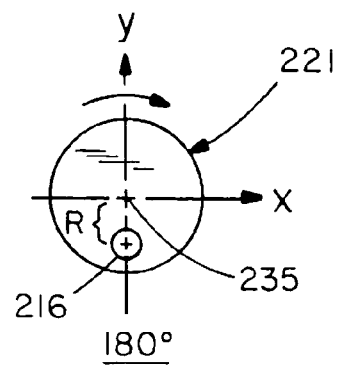
FIG.11A     FIG.11B     FIG.11C
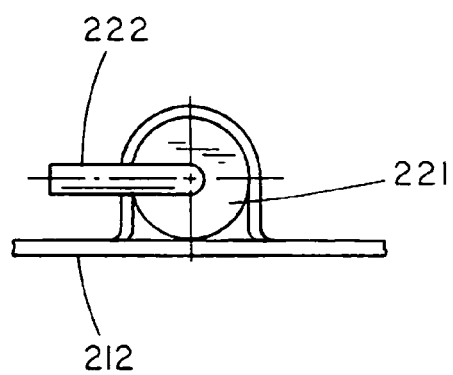
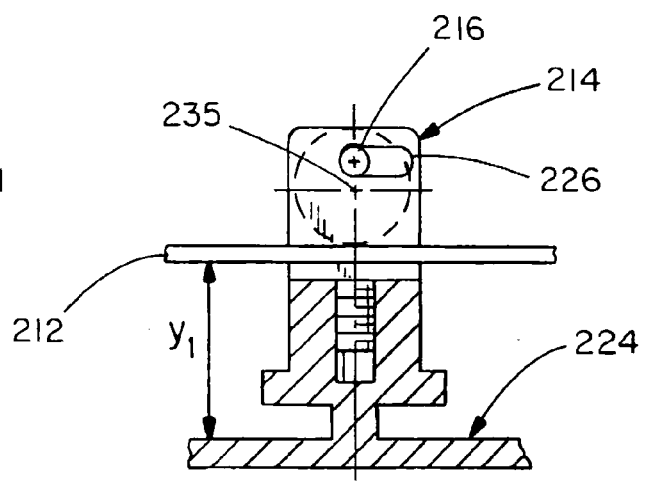
FIG.12A     FIG.12B

RELEASABLE BARB ASSEMBLY

CROSS-REFERENCE TO RELATED APPLICATIONS

This application is a continuation of U.S. application Ser. No. 12/788,686, filed May 27, 2010, which is a continuation of U.S. application Ser. No. 11/764,892, filed Jun. 19, 2007, now U.S. Pat. No. 7,752,730, which is a divisional of U.S. application Ser. No. 10/808,974, filed Mar. 25, 2004, now U.S. Pat. No. 7,246,778, which claims the benefit of U.S. Provisional Application Ser. No. 60/458,139, filed Mar. 27, 2003; U.S. Provisional Application Ser. No. 60/484,405, filed Jul. 2, 2003; U.S. Provisional Application Ser. No. 60/484,429, filed Jul. 2, 2003; and U.S. Provisional Application Ser. No. 60/493,656, filed Aug. 8, 2003, the entirety of the previously filed applications being incorporated herein by reference.

BACKGROUND

1. Field of the Invention

The present invention relates to the field of duct-type cable routing systems. More specifically, the invention relates to fittings that allow quick assembly without the use of tools using a releasable barb assembly.

2. Background

Raceway duct systems have become very popular in recent years to route, protect, and conceal data, voice, video, fiber optic, and/or power cabling. Such systems allow custom installation and can be provided within walls or provided on external surfaces, allowing ready access for reconfiguration, repair, or installation of additional equipment. Such systems may typically include various sections of duct or raceway, including straight sections and various fittings, such as 90° elbow fittings, 45° elbow fittings, T-fittings, four-way intersection (x) fittings, and the like, respective ones of which are affixed together by duct couplers to cumulatively form a duct system.

U.S. Pat. Nos. 6,634,605, 6,523,791, 6,450,458, and 6,559,378 provide examples and descriptions of the general background of cable duct couplers and other cable duct fittings, and the entirety of these applications are incorporated herein by reference as though set forth here in full. U.S. Pat. No. 5,316,243 (assigned to ADC Telecommunications, Inc.) provides a description of the general background and environment of cable routing systems, and the specification of that issued patent is incorporated herein by reference as though set forth here in full.

Due to the increase in the number and sophistication of such raceway duct systems, the number of duct couplers and fittings being installed in such systems has also increased significantly. Therefore, it is important to have couplers and fittings that are easy to install and inexpensive to manufacture, and that provide relatively high resistance to "pullout" forces to prevent unintended disassembly.

Previous designs disclosed a cable barb coupler comprising a barb that could be repeatedly moved between a first "engaged" position and a second "unengaged" position, without any material degradation in the performance of the coupler. However, the switch between the first and second modes required the use of tools to adjust the position of the barb. Although that previous design was an improvement over the prior art, it would be a further improvement to provide a product that offered the same advantages without requiring the use of additional tools. Significantly, the present invention permits the cable duct coupler to be selectively and repeatedly switched between a first "engaged" mode and a second "unengaged" mode without any degradation in performance of the coupler and without any need for or use of separate tools.

SUMMARY

In one embodiment, there is provided a barb assembly for use with a cable duct component to oppose removal of a cable duct section from the cable duct component, the barb assembly comprising a barb comprising a body and one or more barb arms extending from the body to bitingly engage an end of a cable duct section and to oppose removal of a cable duct section from the cable duct component; and a releasable assembly for applying a force to the barb and, responsive to the application of the force, for moving the barb and one or more barb arms from an unengaged position to an engaged position without the use of tools.

In another embodiment, there is also provided a cable duct component that can receive an end of a cable duct section, the cable duct component comprising a barb assembly, the barb assembly comprising a barb comprising a body and one or more barb arms extending from the body to bitingly engage an end of a cable duct section and to oppose removal of a cable duct section from the cable duct component; and a releasable assembly for applying a force to the barb and, responsive to the application of the force, for moving the barb and one or more barb arms from an unengaged position to an engaged position without the use of tools.

In another embodiment, there is also provided a cable duct system comprising a cable duct section comprising an end; and a cable duct component that can receive the end of the cable duct section, the cable duct component comprising a barb assembly, the barb assembly comprising a barb comprising a body and one or more barb arms extending from the body to bitingly engage the cable duct section and to oppose removal of the cable duct section from the cable duct component; a releasable assembly for applying a force to the barb and, responsive to the application of the force, for moving the barb and one or more barb arms from an unengaged position to an engaged position without the use of tools.

In another embodiment, there is also provided a method for assembling a cable duct system, the method comprising providing a cable duct section comprising an end; providing a cable duct component that can receive the end of the cable duct section, the cable duct component comprising a barb assembly, the barb assembly comprising a barb comprising a body and one or more barb arms extending from the body to bitingly engage the end of the cable duct section and to oppose removal of the end of the cable duct section from the cable duct component; and a releasable assembly for applying a force to the barb and, responsive to the application of the force, for moving the barb and one or more barb arms from an unengaged position to an engaged position without the use of tools; inserting the end of the cable duct section into the cable duct component; and without the use of tools, actuating the releasable assembly to the engaged position.

In another embodiment, there is also provided a method for assembling a cable duct system, the method comprising providing a cable duct section comprising an end; providing a cable duct component that can receive the end of the cable duct section and that can engage the cable duct section with a barb; inserting the end of the cable duct section into the cable duct component; and without the use of tools, actuating a releasable assembly to apply a force to the barb and, responsive to the application of the force, engaging the cable duct section with the barb.

In another embodiment, there is also provided a cable duct component comprising a scotch yoke assembly.

In another embodiment, there is also provided a cable duct component comprising a scotch yoke assembly for coupling and uncoupling a cable duct section.

In another embodiment, there is also provided a cable duct component comprising a scotch yoke assembly for engaging and disengaging a barb with an end of a cable duct section.

In another embodiment, there is also provided a cable duct component comprising a cam barrel assembly.

In another embodiment, there is also provided a cable duct component comprising a cam barrel assembly for coupling and uncoupling a cable duct section.

In another embodiment, there is also provided a cable duct component comprising a cam barrel assembly for engaging and disengaging a barb with an end of a cable duct section.

In another embodiment, there is also provided a cable duct component comprising a lever assembly.

In another embodiment, there is also provided a cable duct component comprising a lever assembly for coupling and uncoupling a cable duct section.

In another embodiment, there is also provided a cable duct component comprising a lever assembly for engaging and disengaging a barb with an end of a cable duct section.

In another embodiment, there is also provided a cable duct component comprising a cam assembly.

In another embodiment, there is also provided a cable duct component comprising a cam assembly for coupling and uncoupling a cable duct section.

In another embodiment, there is also provided a cable duct component comprising a cam assembly for engaging and disengaging barb with an end of a cable duct section.

BRIEF DESCRIPTION OF THE DRAWINGS

Embodiments of the present invention are described herein with reference to the drawings, in which:

FIG. 2A is a cross-sectional view that depicts the lever actuated releasable barb assembly in an engaged position;

FIG. 2B is a cross-sectional view that depicts the lever actuated releasable barb assembly in an engaged position with a channel or duct engaged by the barb;

FIG. 2C is a cross-sectional view that depicts the lever actuated releasable barb assembly in the unengaged position with the channel or duct disengaged or removed;

FIG. 3 depicts an alternate embodiment of a lever;

FIGS. 11A-11C depict side views of a bearing and a shaft from the embodiment of FIG. 9;

FIGS. 12A and 12B depict side views of a portion of the barb assembly of FIG. 9 in an engaged position;

DETAILED DESCRIPTION

The releasable barb assemblies described and claimed herein provide new and improved structures and techniques to connect and disconnect components in cable duct systems. The improved barb assemblies described and claimed herein can be mounted on a cable duct component, such as a coupler or fitting, and can selectively engage or unengage a duct, raceway, trough, or other fitting (collectively "duct sections") inserted into the cable duct component. In particular, embodiments of the barb assembly can provide a highly controllable and releasable downward force on a barb to cause the barb to engage a duct section of a cable routing system.

The improvement described and claimed herein involves the releasability of the barb from an engaged position to an unengaged position that is enabled by the use of a releasable assembly coupled to the barb. The releasable assembly brings about a number of advantages. It allows the channel or duct to be removed from the coupler without damaging the channel. As a result, a change can be made to the cable routing system without necessitating the use of new channels. Further, the removal of the channel can be accomplished without the need for any tools. This brings about a savings in labor costs.

Several examples of particular embodiments are provided below. It should be understood, however, that all the arrangements described herein are set forth for purposes of example only. As such, those skilled in the art will appreciate that other arrangements and other assemblies are contemplated as well.

1. Lever Actuated Releasable Barb Assembly Embodiment

This embodiment is directed to a lever actuated releasable barb assembly. The releasable barb assembly can be used advantageously as part of another component, such as a cable duct coupler, for example, to engage and disengage one or more components of cable routing systems.

Figure 1:
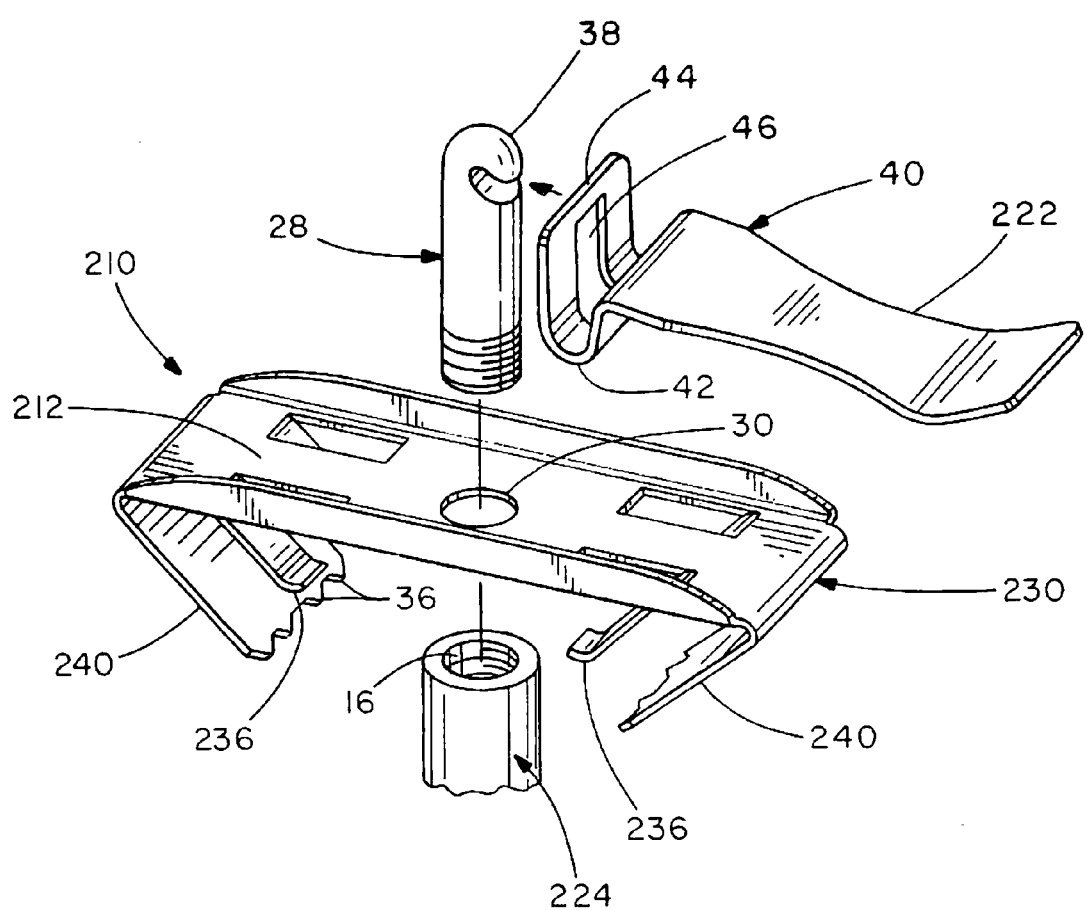
FIG. 1 depicts an exploded view of a first embodiment of the lever actuated releasable barb assembly for use with a cable duct component.

FIGS. 1-5 depict embodiments of the lever actuated releasable barb assembly. FIG. 1 depicts an exploded view of a first embodiment of the lever actuated releasable barb assembly 210 for use in a cable duct component, such as a coupler. The cable duct component is provided with a barb mount 224 that supports a barb 230 and has an internally threaded aperture 16 therein. The barb 230 includes a pair of barb arms 240 bent back relative to a barb body portion 212 at an angle greater than 90° so that the barb arms angle towards each other. The barb body 212 further includes at least one spring tab 236 that extends therefrom at an angle similar to that of the barb arms 240. The barb body 212 is mountable upon the barb mount 224. A lever mount 28 penetrates an opening 30 in the barb 230 and is connected to the barb mount 224, via an aperture 16, for example. The barb 230 may have serrated edges 36 at the distal ends of its barb arms 240.

The lever mount 28 can be provided with a hooked end 38 to enable it to function as a mount for a lever 40. The lever 40 includes a curved portion 42 at one end, the curved portion having a lever mount bearing surface 44 and a slot 46. To mate the lever 40 on the lever mount 28, the surface 44 of the lever 40 is inserted into the hooked end 38 of the lever mount 28. The lever 40 further includes an actuating tab or arm 222 that extends from the curved portion. The arm 222 is used to move the lever 40, and consequently the barb 230, between an engaged position and an unengaged position.

FIGS. 2A, 2B, and 2C are cross-sectional views that depict the releasable barb assembly 210 in use. In the embodiment of FIG. 2A, the barb 230 is shown in the engaged position. The surface 44 of the lever 40 has been inserted into the hooked end 38 of the lever mount 28 and the arm 222 has been pushed in a direction toward the barb body 212. This action pushes the spring tabs 236 against a support shelf 238 on the cable duct component, the spring tabs 236 thereby being placed under tension.

FIG. 2B shows the barb 230 in the engaged position with a channel or duct 54 engaged by the barb 230.

In the embodiment of FIG. 2C, the barb 230 is shown in the unengaged position with the channel or duct 54 disengaged or removed. To release the channel 54, the lever 40 is pivoted about the lever mount 28, thereby moving the arm 222 of the lever 40 in a direction away the barb body 212. This action reduces the force being applied by the lever 40 against the barb body 212 and the spring tabs 236. The pivoting of the lever 40 releases the barb 230, thereby allowing the channel 54 to be disengaged or removed without being damaged by the serrated edges 36 of the barb 230.

To place the barb 230 back in the engaged position from the unengaged position, the lever 40 is again pivoted about the lever mount 28, moving the arm 222 of the lever 40 in a direction toward the barb body 212. Once pivoted, the lever 40 applies a force against the barb 230, thereby moving it toward the cable duct component wall 58. In addition, the spring tabs 236 are placed under tension.

FIGS. 2A, 2B, and 2C depict one embodiment of the lever 40. An alternate embodiment of the lever 60 is shown in FIG. 3, the main difference being that the curved portion 62 of the lever is provided with a flat area 64. As the lever 60 is pivoted about the lever mount to move the barb 230 to the engaged position, the flat area 64 mates against the barb body 212. By being flat rather than rounded, this flat area 64 resists any accidental or inadvertent pivoting of the lever 60.

Figure 4:
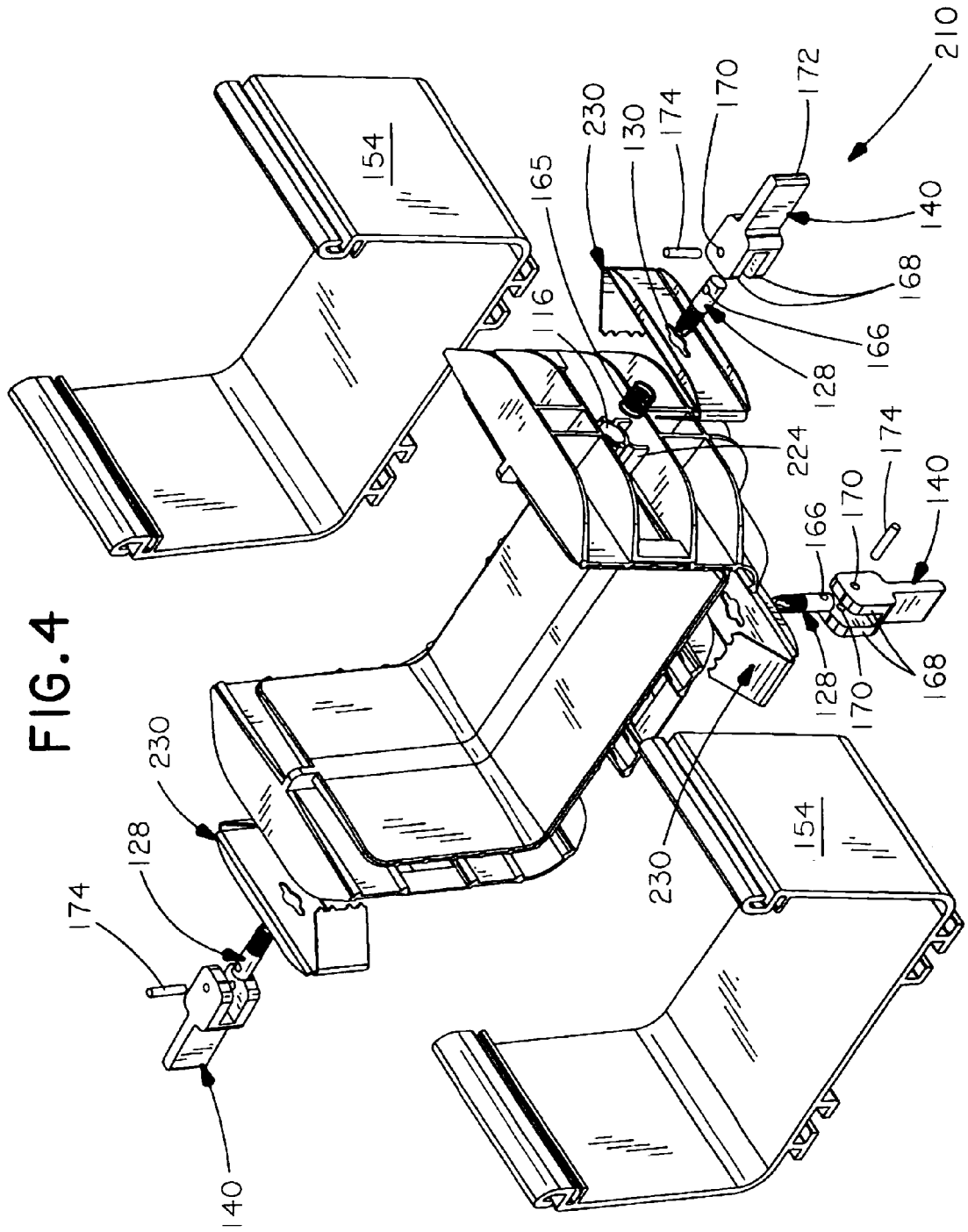
FIG. 4 depicts a second embodiment of the lever actuated releasable barb assembly.
Figure 5:
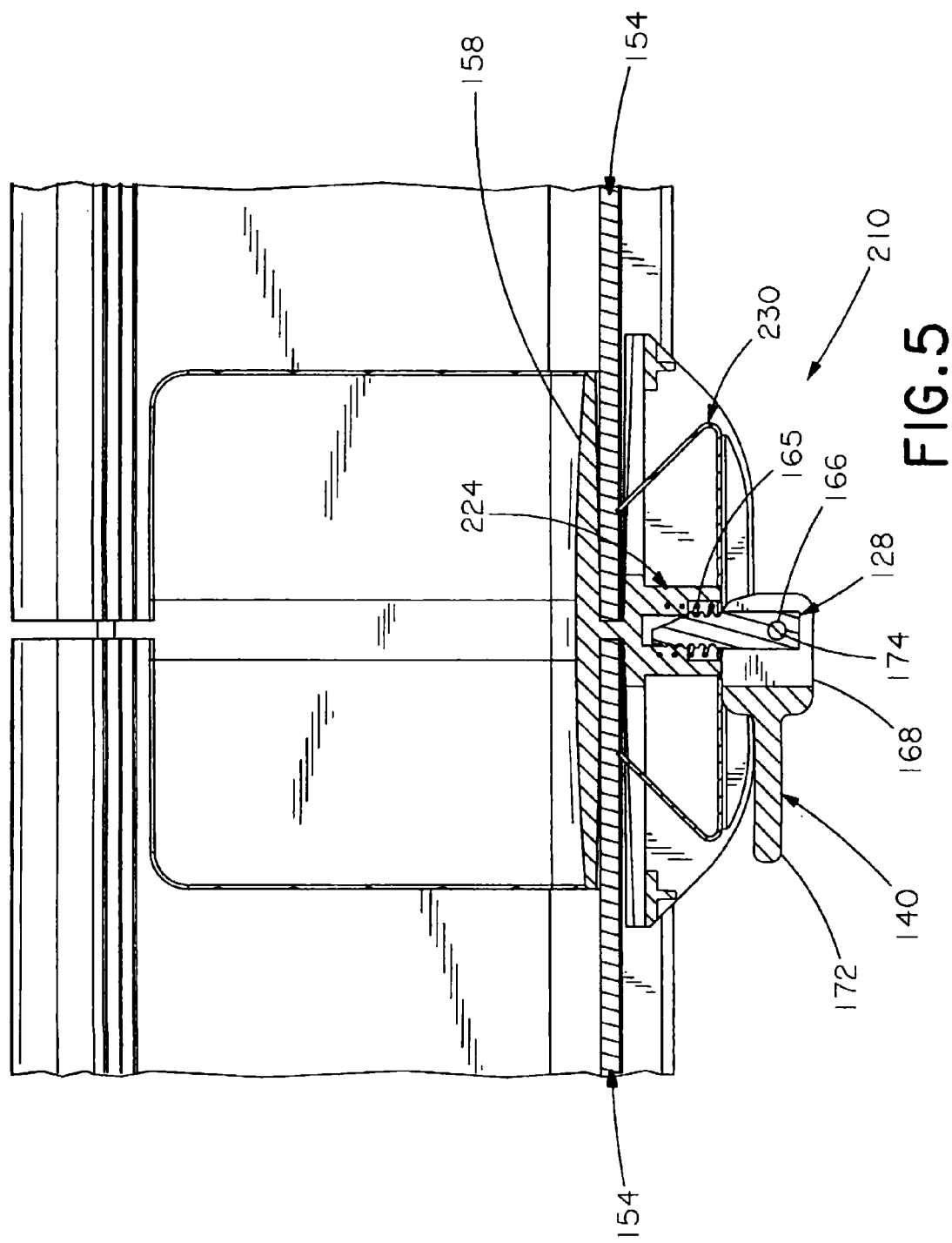
FIG. 5 depicts a second embodiment of the lever actuated releasable barb assembly.

FIGS. 4 and 5 depict a second embodiment of the releasable barb assembly 210. The releasable barb assembly 210 of FIGS. 4 and 5 differs from that of FIGS. 1-3 in the type of coupling between the lever 140 and the lever mount 128. Again the lever mount 128 includes an externally threaded fastener that penetrates a hole 130 in the barb 230 and is directed into the internally threaded aperture 116 in the barb mount 224. A spring 165 is provided within the barb mount 224. As can best be seen from FIG. 4, the lever mount 128 is also provided with a through-hole 166 extending therethrough.

The lever 140 is provided at one end with two curved members 168, each having a hole 170 extending therethrough and an actuating tab 172 extending from the curved members. To couple the lever 140 to the lever mount 128, a pin 174 is inserted through the hole 170 of one curved member 168, the through-hole 166 of the lever mount 128, and the hole 170 of the remaining curved member 168.

To move the barb 230 between the engaged position (shown in FIG. 5) and the unengaged position, the lever 140 is pivoted about the lever mount 128. In the engaged position, the lever 140 acts against the barb 230, thereby compressing the spring 165 and moving the barb 230 toward the cable duct component wall 158. In the unengaged position, the lever 140 applies no force against the barb 230 and the spring 165 pushes against the barb 230. As a result, the barb 230 is released and the channel 154 may be removed without damage.

2. Alternate Lever Actuated Releasable Barb Assembly Embodiment

This embodiment is directed to an alternate lever actuated releasable barb assembly. The releasable barb assembly can be used advantageously as part of another component, such as a coupler or a cable duct reducer fitting, for example, to engage and disengage another component of a cable routing system.

Figure 6:
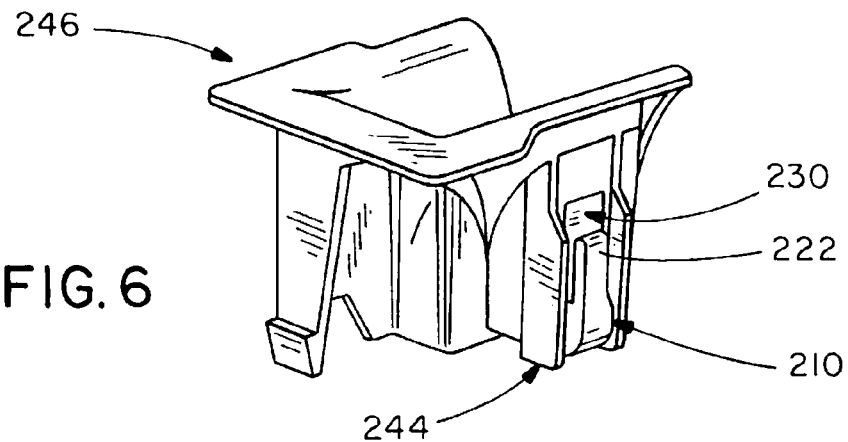
FIG. 6 depicts an isometric view of a cable duct component comprising an alternate lever actuated releasable barb assembly.
Figure 7A:
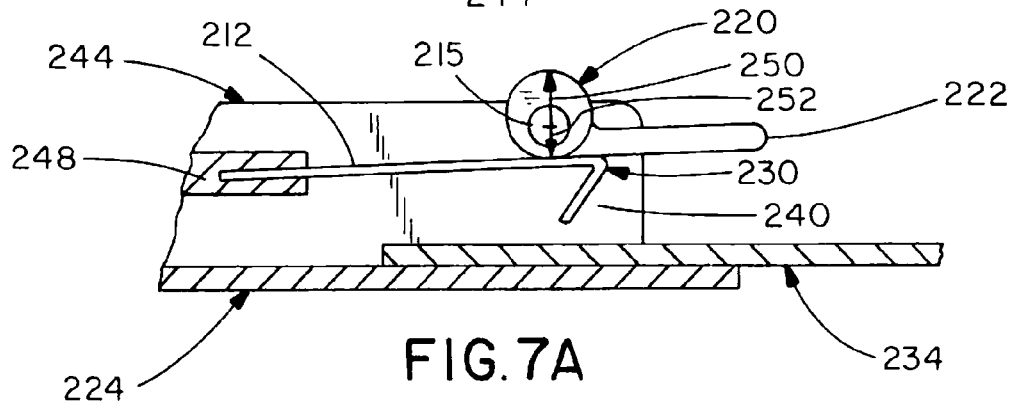
FIG. 7A depicts a side view of a portion of the embodiment of FIG. 6 in the unengaged position.
Figure 7B:
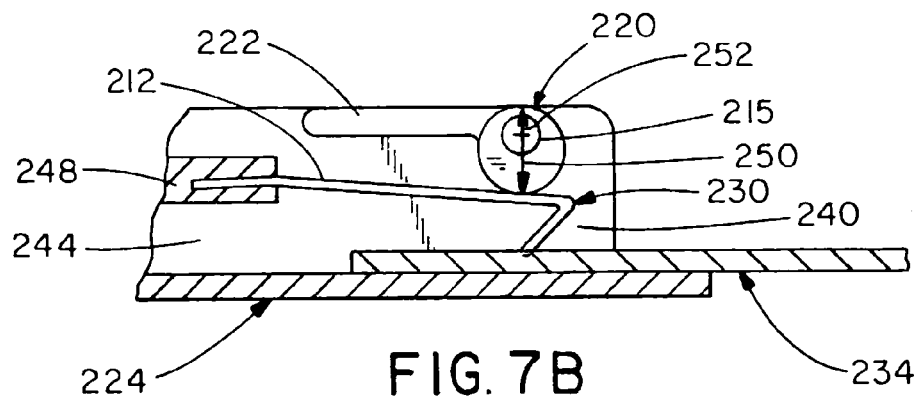
FIG. 7B depicts a side view of a portion of the embodiment of FIG. 6 in the closed position.
Figure 8:
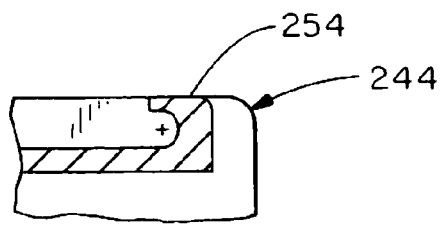
FIG. 8 depicts a side view of a detail of the embodiment of FIG. 6.

FIGS. 6-8 depict an embodiment of the alternate lever actuated releasable barb assembly. As shown in the embodiment of FIG. 6, an alternate lever actuated releasable barb assembly 210 can comprise a barb 230, a sidewall 244, and an arm 222. In one embodiment, the releasable barb assembly 210 can be a part of another component in a cable routing system, such as a reducer fitting 246.

FIGS. 7A and 7B depict a portion of the releasable barb assembly 210 of FIG. 6. In the embodiments of FIGS. 7A and 7B, the barb 230 comprises a barb body portion 212 and a barb arm 240, which may be bent back relative to the barb body 212 at an angle greater than 90°. A portion of the barb body 212 can fixedly engage a cantilever portion 248 of a cable routing component, such as the reducer fitting 246. In addition, the arm 222 can be connected to a cam 220 and can facilitate the rotation of the cam 220. The cam 220, in turn, can comprise at least one pivot 215. FIGS. 7A and 7B further depict a component 234 of a cable routing system, which the releasable barb assembly 210 can engage.

In the embodiments of FIGS. 7A and 7B, the cam 220 is eccentric or offset from the center of the pivot 215, such that the cam 220 comprises a larger radial dimension 250 and a smaller radial dimension 252. Thus, as the cam 220 rotates around the pivot 215, the cam 220 can act on the barb body 212. For example, as the larger radial dimension 250 rotates toward or away from the barb body 212, the barb body 212 tends to move toward or away from, respectively, the component 234 and/or the barb assembly base 224.

In the embodiment of FIG. 7A, the barb body 212 is tangential to the cam 220 at the approximate location of the smaller radial dimension 252. As the cam 220 rotates toward this position, the barb body 212 tends to move away from the barb assembly base 224 (and/or the component 234) and toward the unengaged position. In one embodiment, the cantilever portion 248 exerts a force on the barb body 212 that tends to move the barb body 212 away from the barb assembly base 224 (and/or the component 234) and toward the unengaged position. In the unengaged position, generally, the component 234 can be inserted or removed from the releasable barb assembly 210.

In the embodiment of FIG. 7B, the barb body 212 is tangential to the cam 220 at the approximate location of the larger radial dimension 250. As the cam 220 rotates toward this position, the barb body 212 tends to move closer to the barb assembly base 224 (and/or the component 234) and toward the closed position. In one embodiment, the rotation of the larger radial dimension 250 of the cam 220 toward the closed position overcomes any force that the cantilever portion 248 exerts on the barb body 212. In the closed position, generally, the barb arm 240 resists the removal of component 234 from the releasable barb assembly 210.

In the embodiments of FIGS. 7A and 7B, the arm 222, the cam 220, and the pivot 215 can rotate between the closed and unengaged positions to cause or allow the barb body 212 to move closer to or further away from the barb assembly base 224 and/or the component 234. For example, if the arm 222 rotates in a first direction, the cam 220 can act on the barb body 212 to cause or allow the barb body 212 to move closer to the barb assembly base 224 and/or the component 234. And if the arm 222 rotates in a second direction, the cam 220 can act on the barb body 212 to cause or allow the barb body 212 to move further away from the barb assembly base 224 and/or the component 234. In one embodiment, the arm 222 can then be rotated to an unengaged position or an engaged position, and the releasable barb assembly 210 can then be locked in either position.

As the arm 222 rotates to the closed position, the barb arm 240 can bitingly engage the component 234. When a tensile "pullout" force is then applied to the component 234, the barb arm 240 (which might have a serrated edge, for example) may penetrate into the component 234 and/or oppose movement of the component 234. The barb 230 thus resists separation of the component 234 from the releasable barb assembly 210 or barb assembly base 224.

FIG. 8 depicts a detail of the releasable barb assembly 210 of FIGS. 7A and 7B. As shown in the embodiment of FIG. 8, the releasable barb assembly 210 can also comprise at least one pivot boss 254. The pivot boss 254 can, for example, be a part of the sidewall 244 of the releasable barb assembly 210. Further, the pivot boss 254 can engage each pivot 215 and, in one embodiment, can resist non-rotational movement of the pivot 215, while allowing the pivot 215, and hence the cam 220, to rotate between the unengaged and closed positions.

3. Scotch Yoke Actuated Releasable Barb Assembly Embodiment

This embodiment is directed to a scotch yoke actuated releasable barb assembly. The releasable barb assembly can be used advantageously as part of another component, such as a cable duct coupler, for example, to engage and disengage one or more components of cable routing systems.

Figure 9:
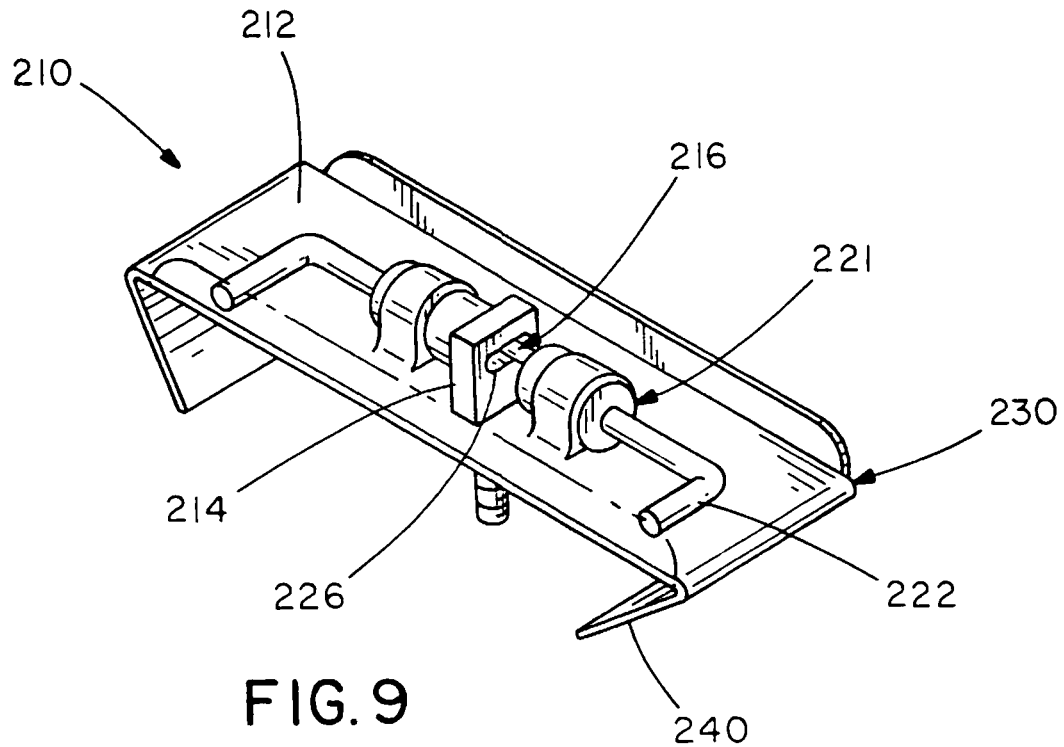
FIG. 9 depicts an isometric view of a first embodiment of the scotch yoke actuated releasable barb assembly for use with a cable duct component.

FIGS. 9-17C depict embodiments of the scotch yoke actuated releasable barb assembly. As shown in the embodiment of FIG. 9, a scotch yoke actuated releasable barb assembly 210 comprises a barb body portion 212, a yoke 214, a shaft 216, and bearings 221. In one embodiment, the releasable barb assembly 210 comprises one or more arms 222, and the arms 222 facilitate the rotation of the bearings 221. FIG. 9 also depicts a barb 230 comprising the barb body 212 and one or more barb arms 240, which may be bent back relative to the barb body 212 at an angle greater than 90°.

Figure 10:
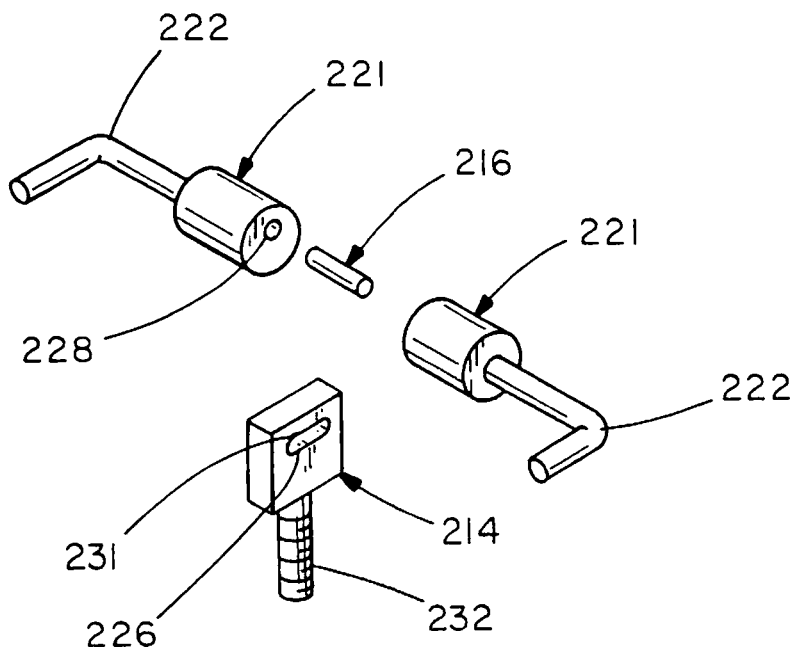
FIG. 10 depicts an exploded view of the embodiment of FIG. 9.

As shown in the embodiment of FIG. 10, the scotch yoke 214 comprises a slot 226 with a detent 231 and a rod 232. In one embodiment, the rod 232 is threaded and fixedly engages a cable duct component, such as a coupler (not shown) or a coupler base 224 (shown in FIGS. 12B, 13B, and 14B). Further, the bearing 221 can comprise an opening 228 that engages the shaft 216. In other embodiments, the bearings 221 are formed integrally with the shaft 216. Other examples are possible as well. In one embodiment, the slot 226 engages the shaft 216, such that the arms 222 and the bearings 221 can rotate and cause the slot 226 to act on the shaft 216.

FIGS. 11A-11C depict the bearing 221 and shaft 216 of FIG. 10. In the embodiments of FIGS. 11A-11C, the shaft 216 can be eccentric or offset from the rotational center 235 of the bearing 221. In such a case, as the bearing 221 is rotated, the shaft 216 follows a radial path and moves in both the "x" and "y" directions relative to the rotational center 235. In one embodiment, as the shaft 216 moves in the y direction, the slot 226 of the yoke 214 acts on the shaft 216 to cause the barb body 212 to move in the y direction.

FIGS. 11A-11C depict a radial path of the shaft 216 as the bearing 221 is rotated from the 0° position to the 180° position. FIG. 11A depicts the bearing 221 at the 0° position and the shaft 216 at the x=0, y=R position relative to the rotational center 235 of the bearing 221. As depicted in the embodiment of FIG. 11B, the bearing 221 can rotate to the 90° position and can cause the shaft 216 to rotate to the x=R, y=0 position. And as shown in the embodiment of FIG. 11C, the bearing 221 can rotate to the 180° position and can cause the shaft 216 to rotate to the x=0, y=−R position.

FIGS. 12A and 12B depict the releasable barb assembly 210 in an engaged position. As depicted in the embodiments of FIGS. 12A and 12B, in the closed position, the shaft 216 is located at, approximately, the x=0, y=R position ("the (0, R) position") relative to the rotational center 235 of the bearing 221. In one embodiment, the (0, R) position results in the barb body 212 being a distance of $y_2$ from the coupler base 224.

Figure 13A:
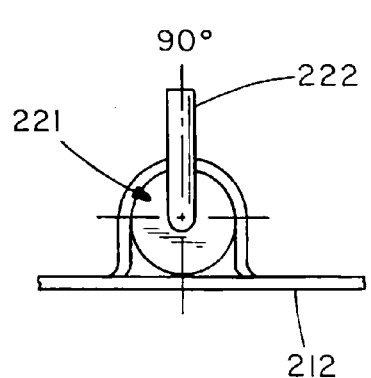
FIGS. 13A and 13B depict side views of a portion of the barb assembly of FIG. 9 in a partially unengaged position.
Figure 13B:
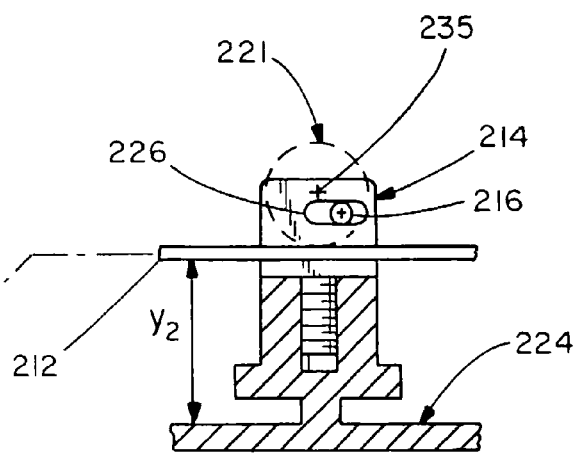

FIGS. 13A and 13B depict the releasable barb assembly 210 in a partially unengaged position. As depicted in the embodiments of FIGS. 13A and 13B, in the partially unengaged position, the shaft 216 may be located at, approximately, the x>0, −R<y<R position relative to the rotational center 235 of the bearing 221. In one embodiment, the x>0, −R<y<R position results in the barb body 212 being a distance of $y_2$ from the coupler base 224.

Figure 14A:
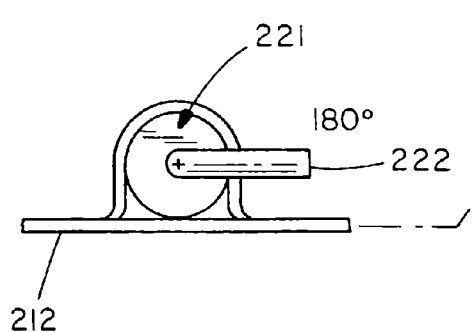
FIGS. 14A and 14B depict side views of a portion of the barb assembly of FIG. 9 in an unengaged position.
Figure 14B:
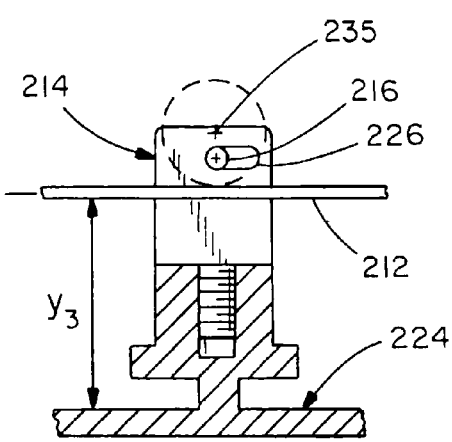

FIGS. 14A and 14B depict the releasable barb assembly 210 in an unengaged position. As depicted in the embodiments of FIGS. 14A and 14B, in the unengaged position, the shaft 216 is located at, approximately, the x=0, y=−R position ("the (0, −R) position") relative to the rotational center 235 of the bearing 221. In one embodiment, the (0, −R) position may result in the barb body 212 being a distance of $y_3$ from the coupler base 224.

In the embodiments of FIGS. 12A-14B, $y_3 > y_2 > y_1$, and the arm 222, bearing 221, and shaft 216 can rotate between the closed, partially unengaged, and unengaged positions to cause or allow the barb body 212 to move closer to or further away from the coupler base 224. For example, if the arm 222 rotates in a first direction, the slot 226 of the yoke 214 may act on the shaft 216 to cause or allow the barb body 212 to move closer to the coupler base 224. And if the arm 222 rotates in a second direction, the slot 226 may act on the shaft 216 to cause or allow the barb body 212 to move further away from the coupler base 224. The arm 222 might then rotate to an unengaged position or an engaged position, and the releasable barb assembly 210 might then be locked in either position.

In the closed position, the barb arm 240 can bitingly engage a component of a cable routing system as the arms 222 rotate to the closed position. When a tensile "pullout" force is then applied to the component of the cable routing system, the barb arm 240 (which might have a serrated edge, for example) may penetrate into the component and/or oppose movement of the component. The barb 230 thus resists separation of the component from the coupler or coupler base 224.

Figure 15A:
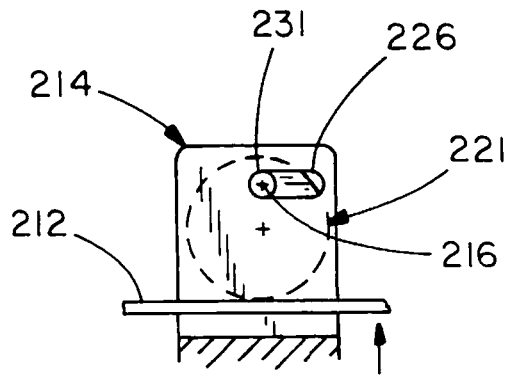
FIGS. 15A-15C depict side views of a yoke comprising a detent from the embodiment of FIG. 9.
Figure 15B:
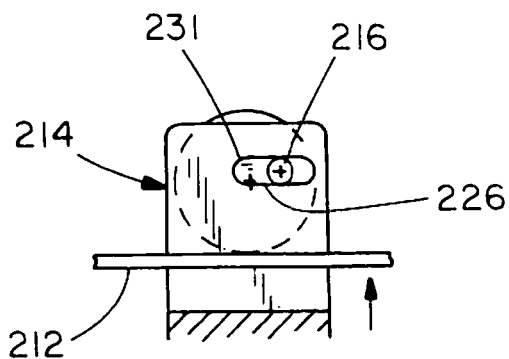
Figure 15C:
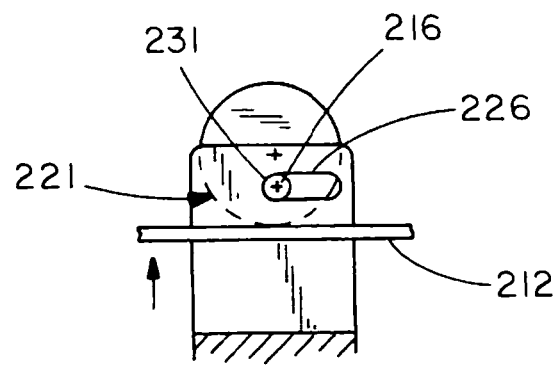

FIGS. 15A-15C depict yoke 214 comprising a slot 226 with a detent 231 that can engage a shaft 216. In one embodiment, as the shaft 216 moves in the x direction, the detent 231 engages the shaft 216 as the shaft 216 nears the x=0 location in the closed and/or unengaged positions. By engaging the shaft 216, the detent 231 may then resist movement of the shaft 216. In one embodiment, the barb arms 240 of the barb 230 provide a force (depicted as an arrow in FIGS. 15A-15C) that acts generally in the y direction on the shaft 216 to tend to cause the detent 231 to engage the shaft 216.

Figure 16:
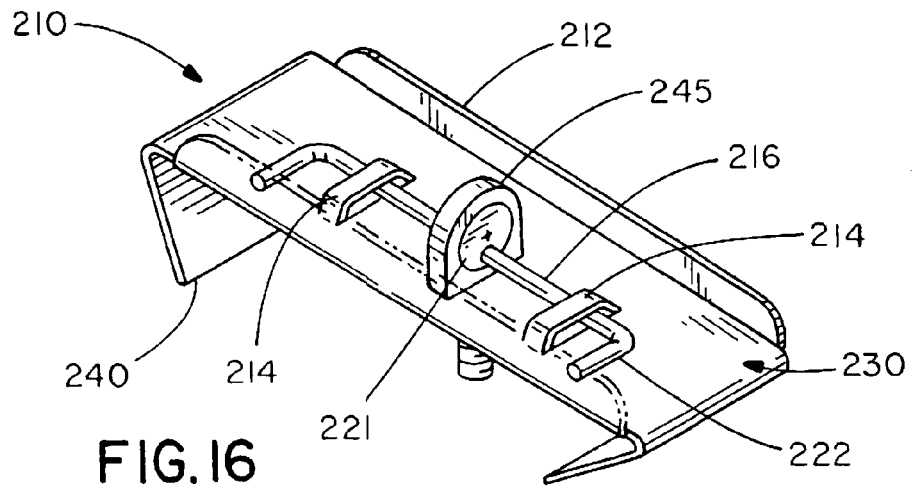
FIG. 16 depicts an isometric view of a second embodiment of the scotch yoke actuated releasable barb assembly.

FIG. 16 depicts an alternate embodiment of the releasable barb assembly 210. In the embodiment of FIG. 16, the releasable barb assembly 210 comprises a barb body portion 212, a bearing block 245, an eccentric bearing 221, and one or more yokes 214. In one embodiment, the releasable barb assembly 210 comprises one or more arms 222 and or one or more shafts 216. The arms 222 can then facilitate the rotation of the shafts 216 and the eccentric bearing 221. FIG. 16 also depicts a barb 230 comprising the barb body 212 and one or more barb arms 240, which may be bent back relative to the barb body 212 at an angle greater than 90°.

Figure 17A:
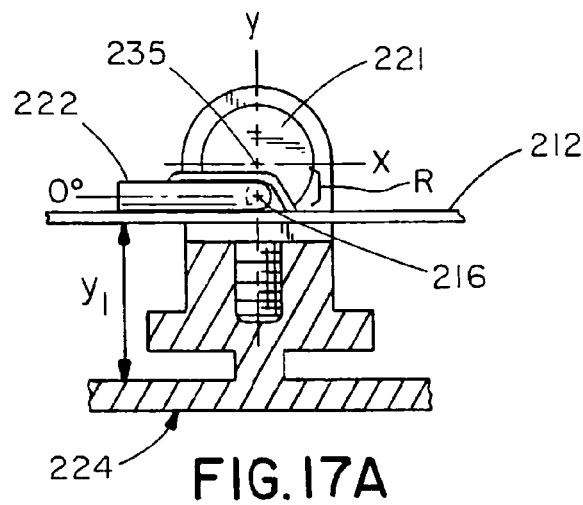
FIGS. 17A-17C depict a radial path of a shaft as a bearing is rotated from the 0° position to the 180° position.
Figure 17B:
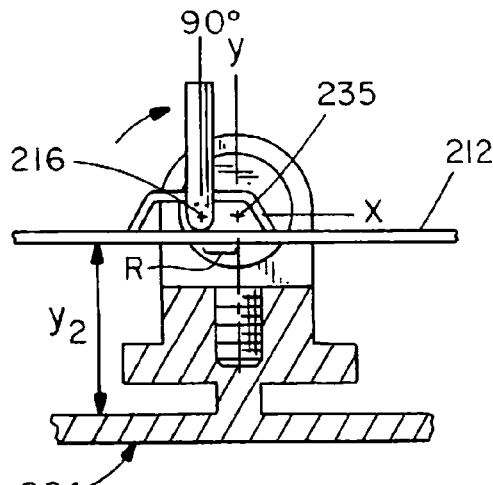
Figure 17C:
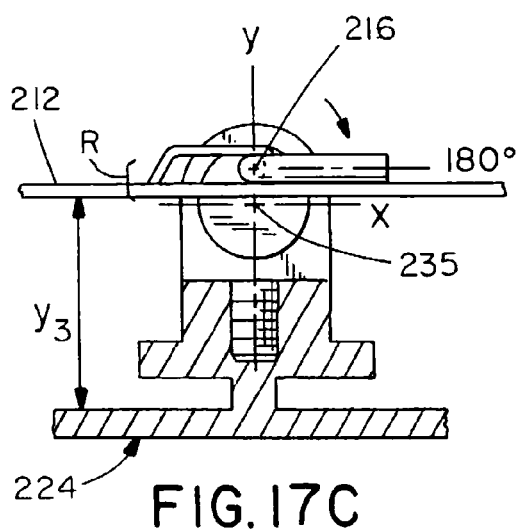

FIGS. 17A-17C depict a radial path of a shaft 216 as the bearing 221 is rotated from the 0° position to the 180° position. FIG. 17A depicts the releasable barb assembly 210 in an engaged position. As depicted in the embodiment of FIG. 17A, in the closed position, the shaft 216 is located at, approximately, the x=0, y=−R position ("the (0, −R) position") relative to the rotational center 235 of the bearing 221. In one embodiment, the (0, −R) position may result in the barb body 212 being a distance of $y_1$ from the coupler base 224.

FIG. 17B depicts the releasable barb assembly 210 in a partially unengaged position. As depicted in the embodiment of FIG. 17B, in the partially unengaged position, the shaft 216 is located at, approximately, the x<0, −R<y<R position relative to the rotational center 235 of the bearing 221. In one embodiment, the x<0, −R<y<R position results in the barb body 212 being a distance of $y_2$ from the coupler base 224.

FIG. 17C depicts the releasable barb assembly 210 in an unengaged position. As depicted in the embodiment of FIG. 17C, in the unengaged position, the shaft 216 may be located at, approximately, the x=0, y=R position ("the (0, R) position") relative to the rotational center 235 of the bearing 221. In one embodiment, the (0, R) position results in the barb body 212 being a distance of $y_3$ from the coupler base 224.

In the embodiments of FIGS. 17A-17C, $y_3 > y_2 > y_1$, and the arm 222, bearing 221, and shaft 216 can rotate between the closed, partially unengaged, and unengaged positions to cause or allow the barb body 212 to move closer to or further away from the coupler base 224. For example, if the arm 222 rotates in a first direction, the shaft 216 may act on the eccentric bearing 221 to cause or allow the barb body 212 to move closer to the coupler base 224. And if the arm 222 rotates in a second direction, the shaft 216 may act on the eccentric bearing 221 to cause or allow the barb body 212 to move further away from the coupler base 224. The arm 222 might then rotate to an unengaged position or an engaged position, and the releasable barb assembly 210 might then be locked in either position.

As in the other embodiments, in the closed position, the barb arm 240 can bitingly engage a component of a cable routing system as the arms 222 rotate to the closed position. When a tensile "pullout" force is then applied to the component of the cable routing system, the barb arm 240 (which might have a serrated edge, for example) may penetrate into the component and/or can oppose movement of the component. The barb 230 thus resists separation of the component from the coupler or coupler base 224.

4. Cam Barrel Actuated Releasable Barb Assembly Embodiment

This embodiment is directed to a cam barrel actuated releasable barb assembly. The releasable barb assembly can be used advantageously as part of another component, such as a cable duct coupler, for example, to engage and disengage one or more components of cable routing systems.

FIGS. 18-23A depict embodiments of the cam barrel actuated releasable barb assembly. Turning to the embodiment of FIG. 18, a cam barrel actuated releasable barb assembly 210 can comprise a barb body portion 212 with one or more tabs or cam followers 219, a cam barrel 217 with one or more cam tracks 218, and a cable duct component base 224. In one embodiment, the tabs or cam followers 219 can engage the cam tracks 218, such that the cam barrel 217 can rotate and cause the cam tracks 218 to act on the tabs 219 of the barb body 212. As the cam barrel 217 rotates, the cam tracks 218 might then cause or allow the barb body 212 to move closer to or further away from the component base 224. For example, if the cam barrel 217 rotates in a first direction, the cam tracks 218 might cause or allow the barb body 212 to move closer to the component base 224. And if the cam barrel 217 rotates in a second direction, the cam tracks 218 might cause or allow the barb body 212 to move further away from the component base 224. The cam barrel 217 might then rotate to an unengaged position or an engaged position, and the releasable barb assembly 210 might then be locked in either position.

In one embodiment, the cam barrel 217 might comprise one or more arms or levers 222, and the arms or levers 222 might facilitate the rotation of the cam barrel 217. Further, in one embodiment, the cam barrel 217 might comprise one or more locking pin recesses 223, and the component base might comprise one or more locking pins 227. The locking pin recesses 223 might act on the locking pins 227 to restrict the range of rotation (shown in FIG. 18 as dashed lines 233) of the cam barrel 217. Other examples are possible, such as the cam barrel 217 comprising one or more locking pins and/or the component base 224 comprising one or more recesses.

Figure 18:
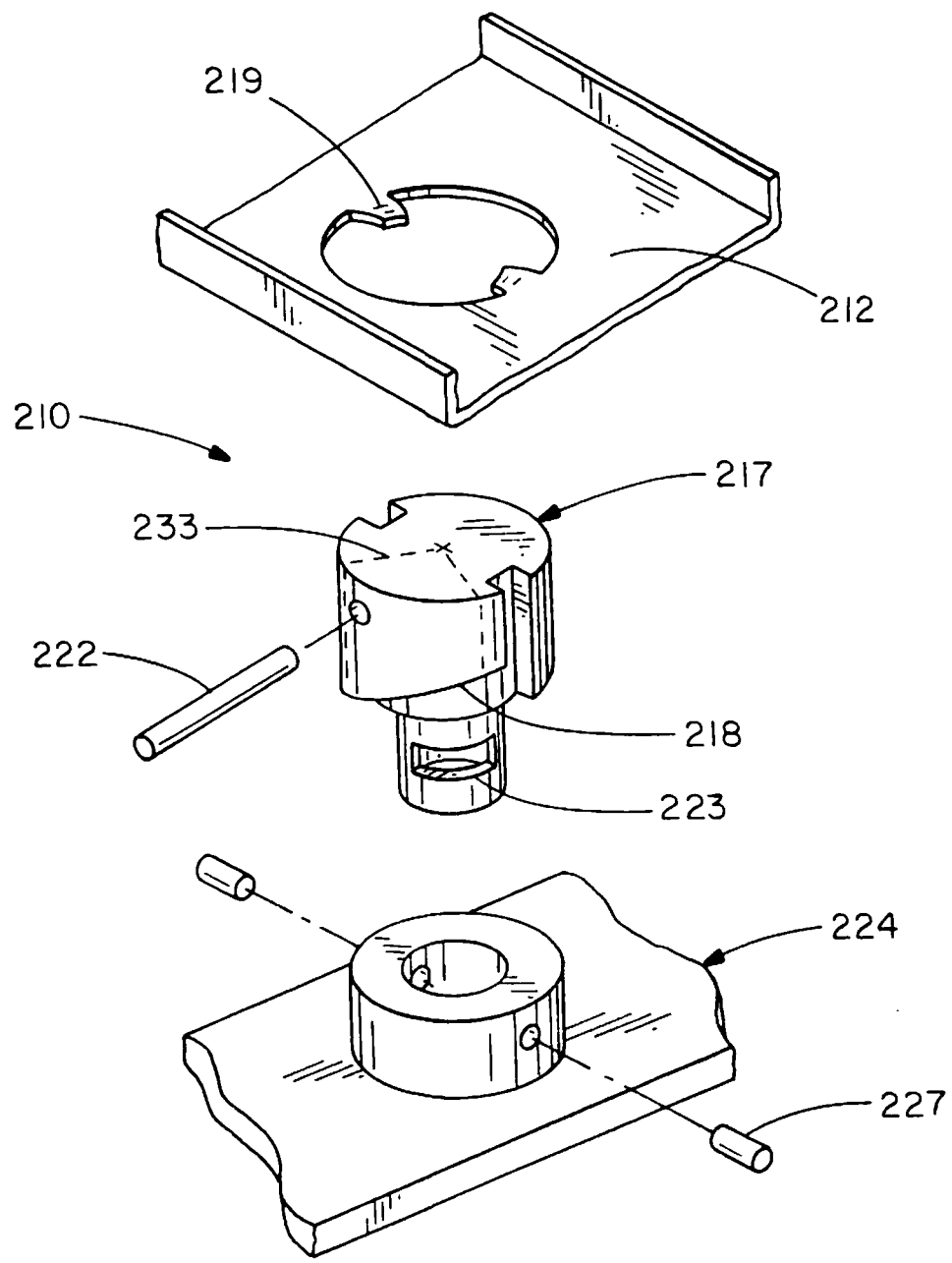
FIG. 18 depicts an exploded view of an embodiment of the cam barrel actuated releasable barb assembly for use with a cable duct component.
Figure 18A:
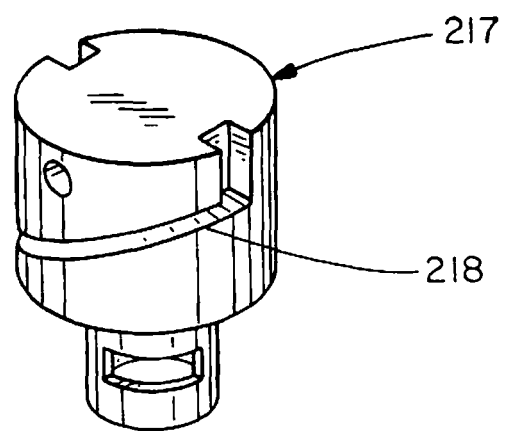
FIG. 18A depicts an alternate cam barrel for the releasable barb assembly of FIG. 18.

FIG. 18A depicts an alternate embodiment of cam barrel 217 comprising alternate cam tracks 218. In the embodiment of FIG. 18A, the cam tracks 218 comprise a channel or groove that can engage the tabs or cam followers 219.

Figure 19:
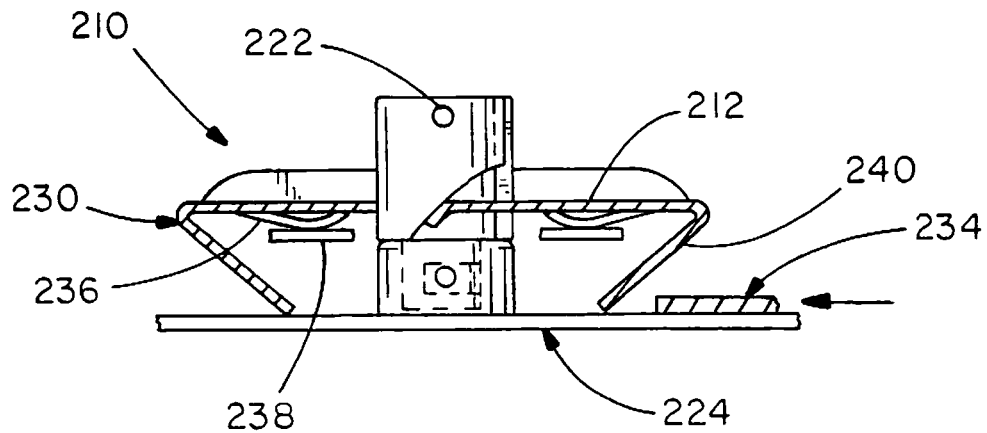
FIG. 19 depicts a side view of the releasable barb assembly of FIG. 18 in an engaged position.

FIG. 19 depicts the releasable barb assembly 210 in an engaged position and not engaging a cable routing component 234. FIG. 19 also depicts a barb 230 comprising the barb body 212 and one or more barb arms 240, which might be bent back relative to the barb body 212 at an angle greater than 90°. In one embodiment, the barb 230 might comprise one or more spring tabs 236, which, in turn, might act on a support component 238, such as a support shelf on a cable duct component. The spring tabs 236 might then tend to cause the barb body 212 and/or the barb 230 to move away from the component base 224 as the cam barrel 217 rotates to the unengaged position.

Figure 20:
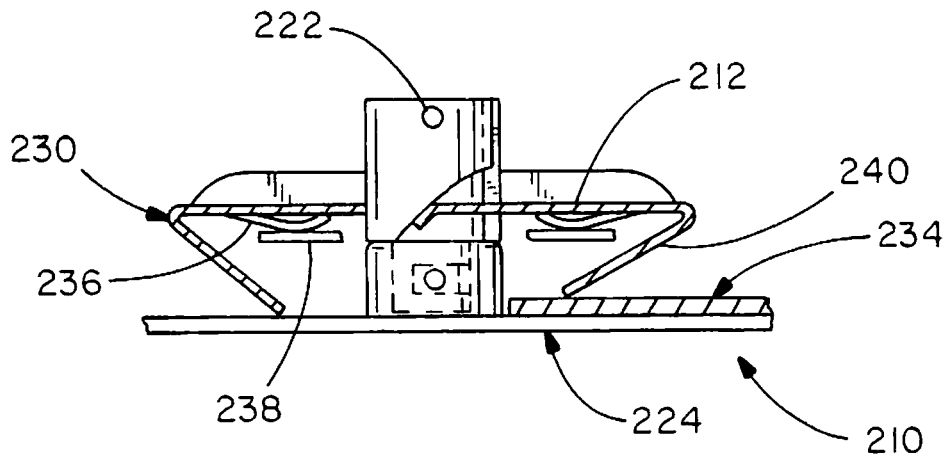
FIG. 20 depicts a side view of the releasable barb assembly of FIG. 18 in an engaged position and engaging a cable routing component.

FIG. 20 depicts the releasable barb assembly 210 in an engaged position and engaging the component 234. As depicted in the embodiment of FIG. 20, the barb arm 240 can bitingly engage the component 234 as the cam barrel 217 rotates to the closed position. When a tensile "pullout" force is then applied to the component 234, the barb arm 240 (which might have a serrated edge, for example) might penetrate into the component 234 and/or can oppose movement of the component 234. The barb 230 can thus resist separation of the component 234 from the cable duct component or component base 224.

Figure 21:
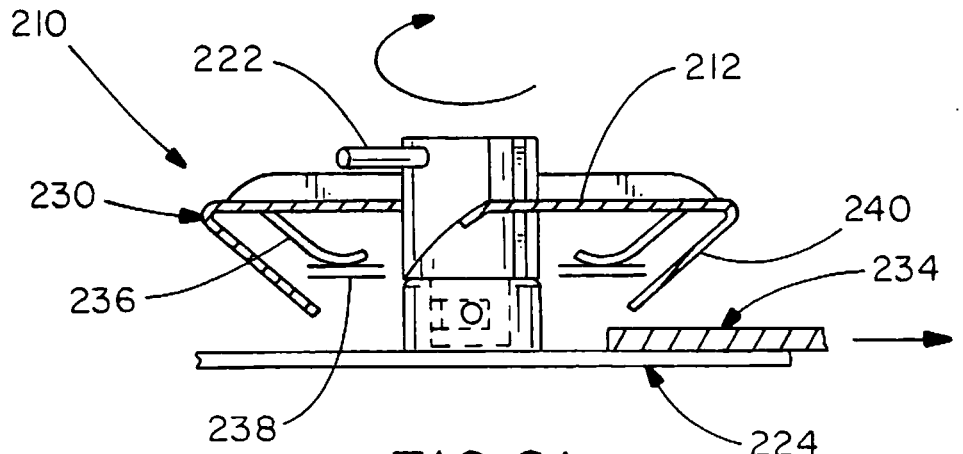
FIG. 21 depicts a side view of the releasable barb assembly of FIG. 18 in an unengaged position.

FIG. 21 depicts the releasable barb assembly 210 in an unengaged position and not engaging the component 234. As depicted in the embodiment of FIG. 21, the spring tabs 236 can act on the support component 238 to tend to cause the barb body 212 and/or the barb 230 to move away from the component base 224. In such a way, the barb arm 240 and in turn the releasable barb assembly 210 can disengage the component 234 as the cam barrel 217 rotates to the unengaged position.

Figure 22:
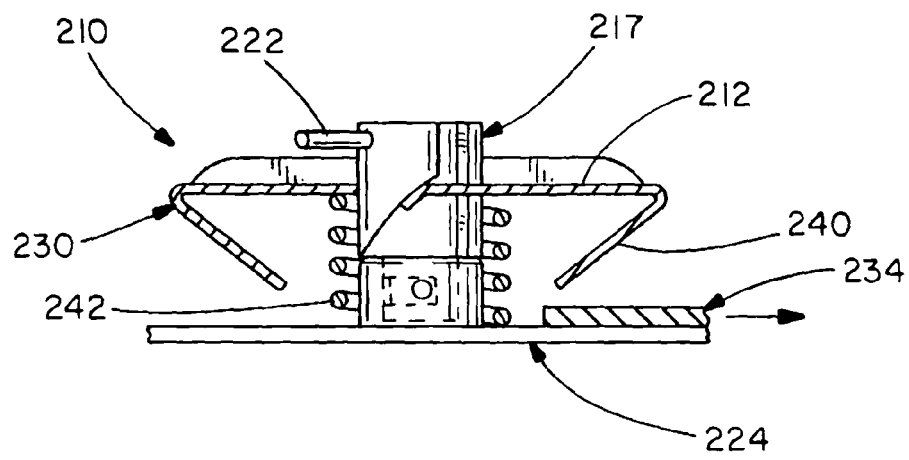
FIG. 22 depicts a side view of the releasable barb assembly of FIG. 18 with a spring.

In the embodiment of FIG. 22, the releasable barb assembly 210 comprises a spring 242. In one embodiment, the spring 242 can act on the barb body 212 to tend to cause the barb body 212 and/or the barb 230 to move away from the component base 224. In such a way, the barb arm 240 and in turn the releasable barb assembly 210 might disengage the component 234 as the cam barrel rotates to the unengaged position. In one embodiment, spring 242 might be a coaxial compression spring, but other examples are possible as well.

Figure 23:
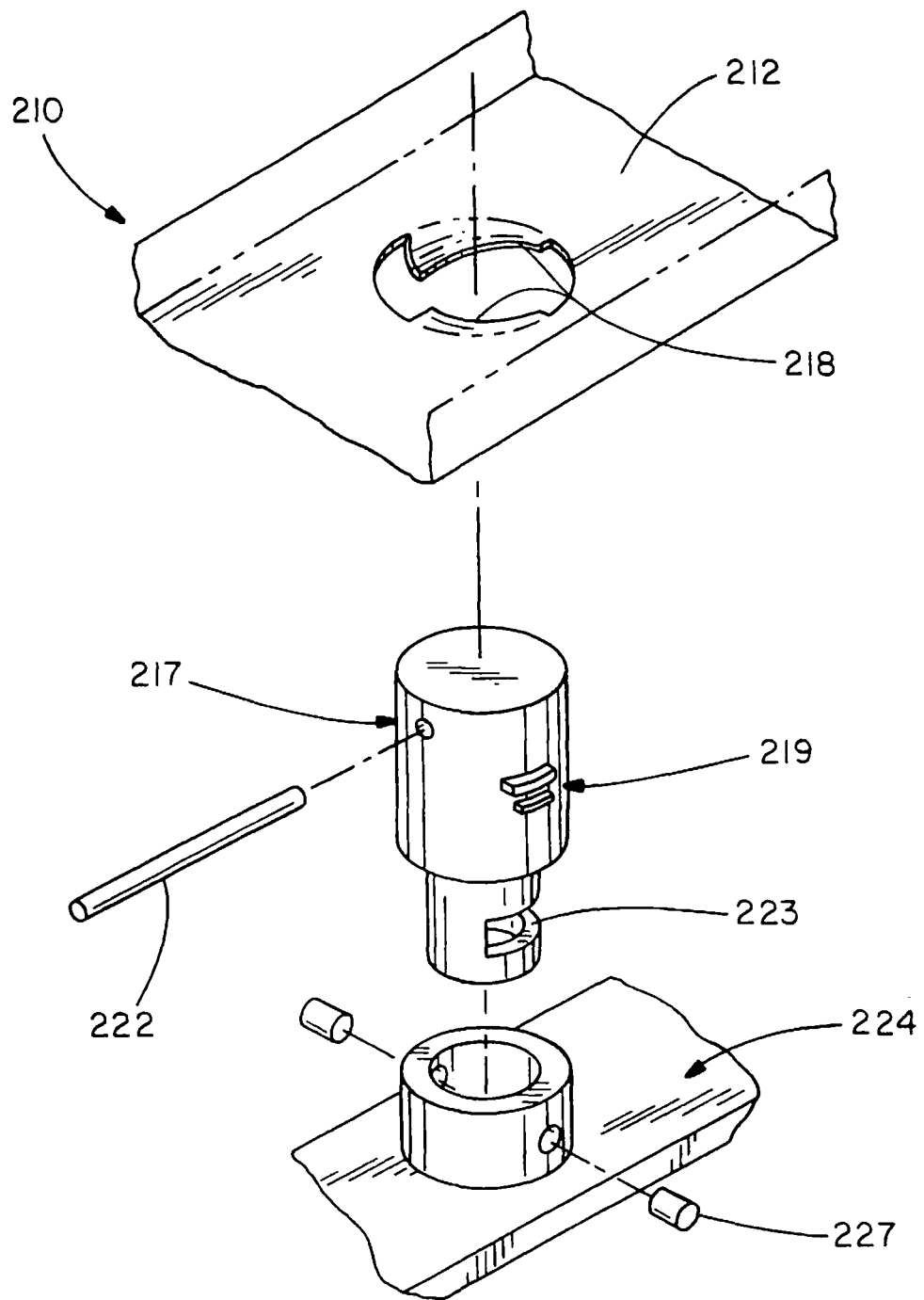
FIG. 23 depicts an exploded view of an alternate embodiment of the cam barrel actuated releasable barb assembly.

FIG. 23 shows another embodiment of the releasable barb assembly 210. In the embodiment of FIG. 23, the barb body 212 can comprise cam tracks 218 and the cam barrel 217 can comprise tabs or cam followers 219. The tabs or cam followers 219 can then engage the cam tracks 218, such that the cam barrel 217 can rotate and cause the tabs 219 to act on the cam tracks 218. As in other embodiments, the cam barrel 217 might then rotate to an unengaged position or an engaged position, and the releasable barb assembly 210 might then be locked in either position.

Figure 23A:
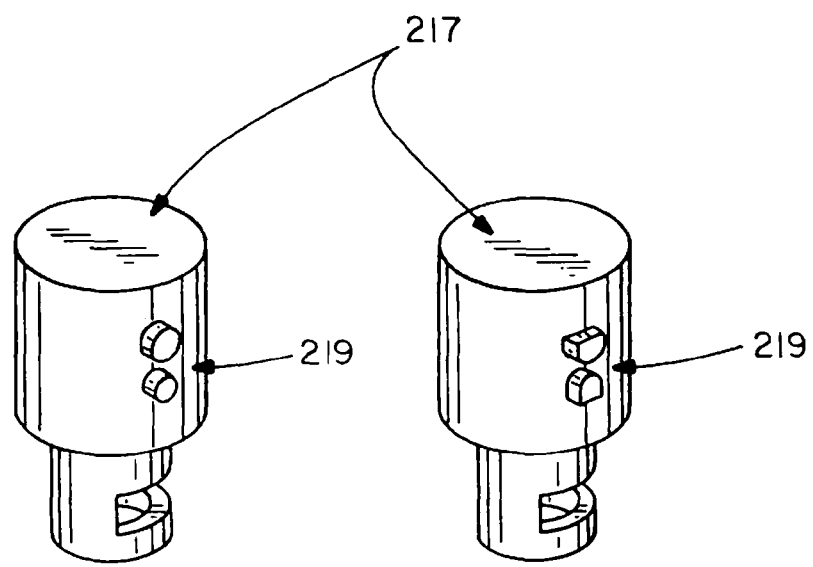
FIG. 23A depicts alternate cam barrels of the releasable barb assembly of FIG. 23.

FIG. 23A depicts alternate embodiments of cam barrel 217 comprising alternate tabs or cam followers 219.

5. Conclusion

Several examples of particular embodiments of the present invention have been described above. Those skilled in the art will understand, however, that changes and modifications may be made to these embodiments without departing from the true scope and spirit of the present invention, which is defined by the claims.

The invention claimed is:

1. A barb assembly for use with a cable duct component to oppose removal of a cable duct section from the cable duct component, the barb assembly comprising:
    a barb comprising a body and one or more barb arms extending from the body to engage a cable duct section and to oppose removal of the cable duct section from the cable duct component; and
    a releasable assembly for moving the barb and one or more barb arm from an unengaged position to an engaged position.

2. The barb assembly of claim 1, wherein actuating the releasable assembly to an engaged position causes at least one of the barb arms to bitingly engage the cable duct section.

3. The barb assembly of claim 1, wherein the releasable assembly is in the engaged position and at least one of the barb arms is bitingly engaging a cable duct section.

4. The barb assembly of claim 1, further comprising a spring bias that biases the releasable assembly to the unengaged position upon actuating the releasable assembly to the unengaged position.

5. The barb assembly of claim 1, wherein the releasable assembly comprises a scotch yoke assembly.

6. The barb assembly of claim 5, wherein the scotch yoke assembly further comprises:
    a yoke connected to the cable duct component, the yoke comprising a slot adapted to receive a shaft and to act on the shaft;
    one or more bearings eccentrically connected to the shaft, the bearings adapted to rotate and act on the barb; and
    one or more arms, each concentrically connected to one of the bearings and each adapted to rotate.

7. The barb assembly of claim 6, wherein rotation of the one or more arms causes the slot to act on the shaft and the bearing to act on the barb to apply a force to the barb and, responsive to the application of the force, to move the barb and one or more barb arms from an unengaged position to an engaged position without the use of tools.

8. The barb assembly of claim 1, wherein the releasable assembly comprises a cam barrel assembly.

9. The barb assembly of claim 8, wherein the cam barrel assembly further comprises a cam barrel rotatably connected to the cable duct component, the cam barrel comprising a cammed slot adapted to receive a portion of the barb body and adapted to act on the barb.

10. The barb assembly of claim 9, further comprising one or more arms extending from the cam barrel.

11. The barb assembly of claim 9, wherein rotation of the cam barrel causes the cammed slot to act on the barb to apply a force to the barb and, responsive to the application of the force, to move the barb and one or more barb arms from an unengaged position to an engaged position without the use of tools.

12. The barb assembly of claim 1, wherein the releasable assembly comprises a lever assembly.

13. The barb assembly of claim 12, wherein the lever assembly further comprises a lever and a lever mount, the lever comprising a lever mount bearing surface and a barb bearing surface, the lever mount bearing surface adapted to act on the lever mount and the barb bearing surface adapted to act on the barb.

14. The barb assembly of claim 13, wherein actuation of the lever causes the lever mount bearing surface to act on the lever mount and causes the barb bearing surface to act on the barb to apply a force to the barb, and responsive to the application of the force, to move the barb and one or more barb arms from an unengaged position to an engaged position without the use of tools.

15. The barb assembly of claim 13, wherein the barb mount includes an internally threaded aperture and the lever mount includes an externally threaded fastener that engages a hole in the barb and is secured to the internally threaded aperture in the barb mount.

16. The barb assembly of claim 12, wherein the lever includes two curved members, each curved member having a hole extending there through and an actuating tab extending from the curved members.

17. The barb assembly of claim 16, wherein the lever mount further comprising a through hole, whereby a pin is inserted through the hole of one curved member, the through hole of the lever mount and the through hole of the remaining curved member to couple the lever to the lever mount.

18. The barb assembly of claim 1, wherein the barb assembly is part of a cable duct reducer fitting.

19. The barb assembly of claim 1, wherein the releasable assembly comprises a bearing block, an eccentric bearing housed in the bearing block, at least one yoke and at least one arm.

* * * * *